UNITED STATES PATENT OFFICE.

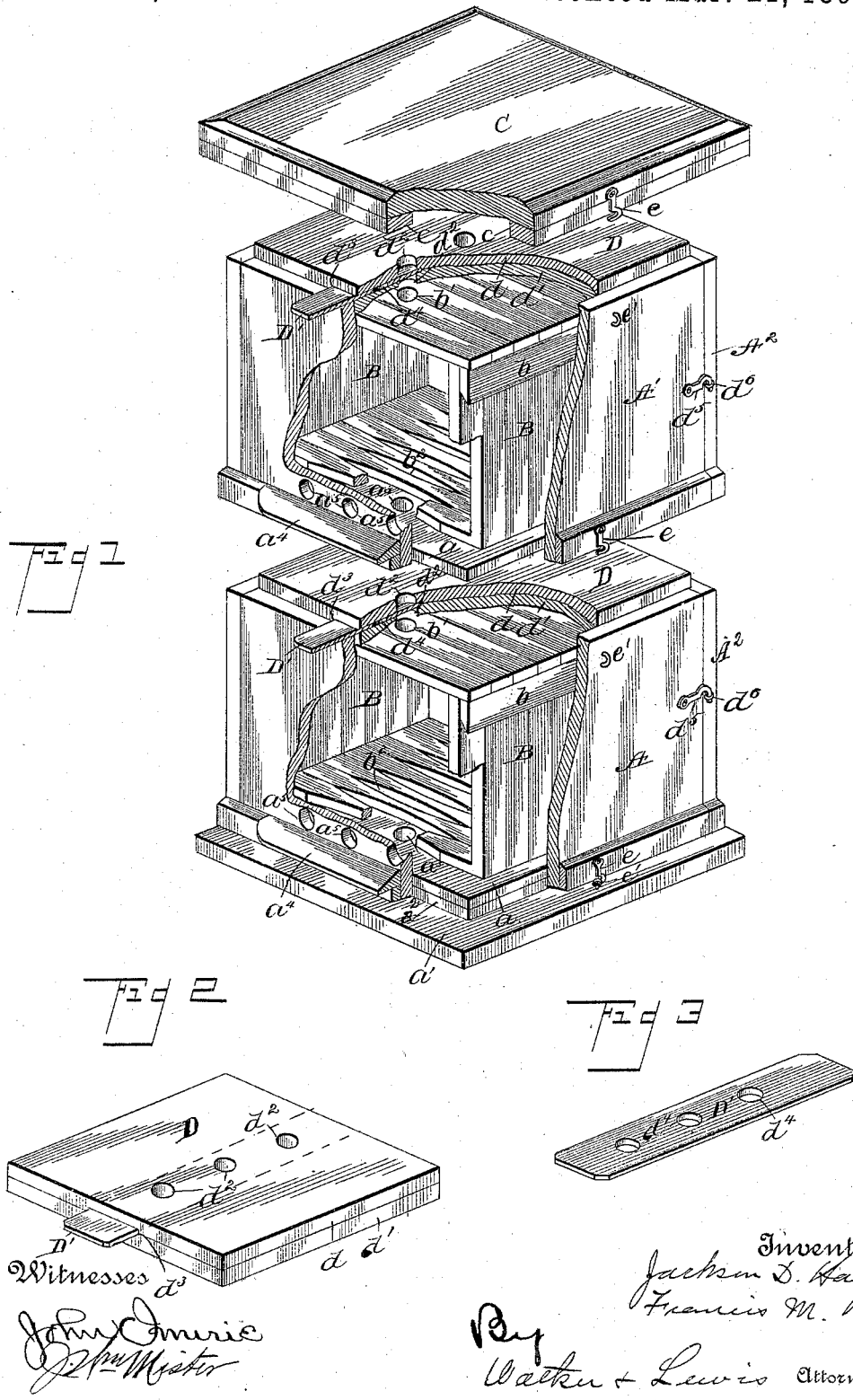

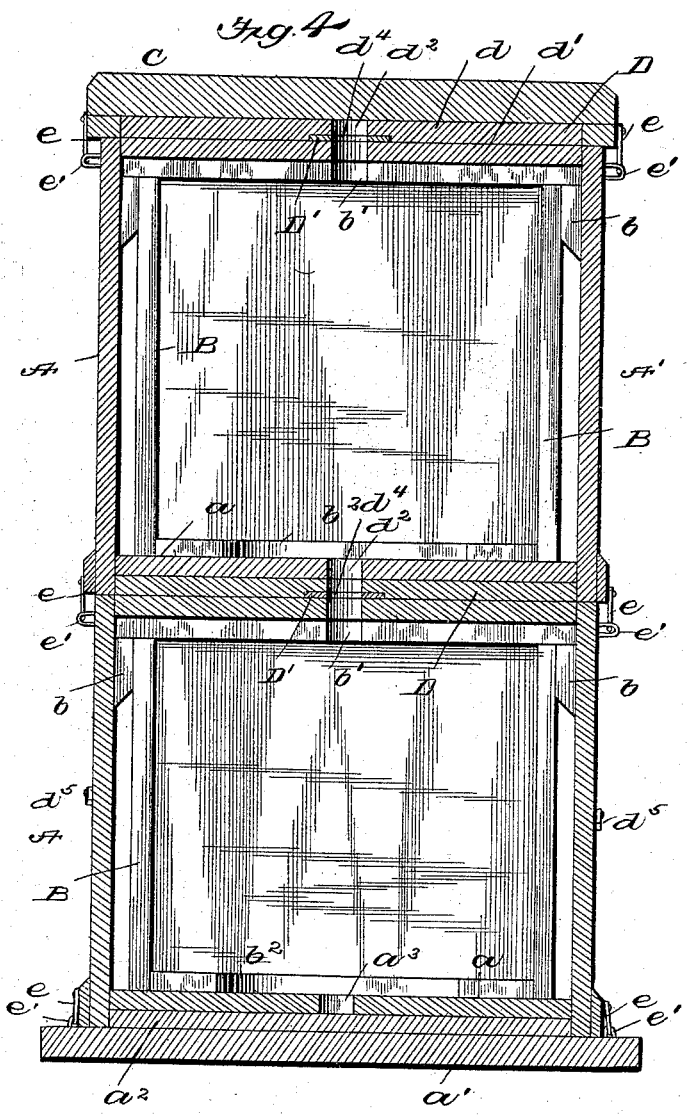

JACKSON D. HAWKINS AND FRANCIS M. RAY, OF TEMPLE, TEXAS.

BEEHIVE.

SPECIFICATION forming part of Letters Patent No. 493,864, dated March 21, 1893.

Application filed October 1, 1892. Serial No. 447,559. (No model.)

*To all whom it may concern:*

Be it known that we, JACKSON D. HAWKINS and FRANCIS M. RAY, citizens of the United States, residing at Temple, in the county of Bell and State of Texas, have invented certain new and useful Improvements in Beehives; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to an improved beehive, and it has for its object to provide for the ready or convenient "robbing" of the hive without subjecting the bees to injury, as experienced in the old way, by smoking the bees out of the hive, and to this end our invention consists of the novel combination and construction of parts substantially as hereinafter more fully disclosed and pointed out in the claims.

In the accompanying drawings: Figure 1 is a broken perspective view of our improved sectional bee hive, with the respective sections separated. Fig. 2 is a detached perspective view of a supplemental cover for each section. Fig. 3 is a perspective view of one of the supplemental cover slides or valves, and Fig. 4 is a sectional elevation of the hive.

In the embodiment of our invention we construct or produce the hive in comb frame containing sections, A A', making them separable and with raised bottoms, $a$, each the counterpart of the other, so that they may be interchangeable, the normally lower one resting upon a base, $a'$, having a central raised portion, $a^2$, fitting within said section below its raised bottom. The normally upper section, A', is superposed upon the lower section, A, with its bottom edge resting upon the top edge of the latter. The bottoms, $a\ a$, of the sections, A A', are provided each with an aligned series or row of three (more or less) apertures or passages, $a^3\ a^3$, for the passage of the bees upward. In the front of each of the sections, A A', just above an alighting platform, $a^4$, secured thereon, at its bottom edge, is a series (three, more or less) of bee entrances, $a^5\ a^5$, the upper series being kept closed when the bees are at work. The sections, A A', are filled, as usual, with comb frames, B, having the projecting end portions of their upper horizontal bars supported upon cleats or strips, $b$, secured to the sides of the sections in the usual manner, these cross-bars, together with the lower cross-bars of said frames, being recessed at opposite points, as at $b'\ b^2$, to form passages therethrough for the bees.

A suitable top, C, is applied to the upper section, A', and has a pendent flange portion, $c$, resting upon the upper edge of said section.

D D are supplemental covers or tops for the sections, A A', one being provided for each section and adapted to rest in the upper part thereof upon the comb frames, B, with the upper part of one cover fitting into the section above into the space just below its raised bottom, the upper part of the other cover being received into the space inclosed or provided by the flange portion, $c$, of the top, C. Each supplemental cover consists, preferably, of an upper part $d$ and a lower part, $d'$, each having a series of apertures or passages, $d^2$, adapted to align with each other and the apertures or passages, $b'$, between the upper cross-bars of the comb frames, thus providing for the passage of the bees therethrough from one section to the other. Each supplemental cover is also provided with a slide or valve, D', working in a slot or seat, $d^3$, and having a series of apertures, $d^4$, adapted to register with the apertures, $d^2$, of the upper and lower parts, $d$, $d'$ of the cover, or to be adjusted out of alignment with the latter apertures, as may be desired, by accordingly moving the slide or valve. The slides or valves, D', are caused to project at one end out through the comb containing sections, A A', to provide for their convenient manipulation.

The comb containing sections, A A', are removably or separably connected to one another by means of suitable hooks or latches, $e\ e$, pivoted to said sections and engaging eyes or staples, $e'\ e'$, secured thereto. Each section has one side formed into a door, $A^2$, it being hinged at one vertical edge and provided at the opposite edge with a hook, $d^5$, engaging a suitable eye or staple, $d^6$, on the section. It will, therefore, be apparent that, when it is desired to "rob" or examine, say, the upper section, A', by opening the entrances to the latter, they being closed, as above intimated, during the working of the bees, and adjusting or moving the slide, D', of the lower supplemental cover, D, so as to cut off communication between the two sections, the bees will begin to leave the upper section through its entrances until they have all passed out, returning to the lower section, A, and yet being prevented, by said slide or valve, from passing up into the upper section, A', the bees thus being expelled without having been subjected to a smoking process, as practiced in the old way, and suffering injury as they would have otherwise. The cover or top, C is now removed from the upper section, A', and the latter removed from the lower section, A, and conveyed to a convenient point for examination or removal of its contents. The removed section, after examination or removal of its honey, is returned and placed in position as before.

We claim as new—

1. In a bee-hive, interchangeable sections containing comb-frames, each having bee entrances, and a bottom provided with bee passages, in combination with a removable supplemental cover composed of two parts, and an intermediate slide or valve having apertures or passages adapted to register or align with apertures or passages in said parts of said cover said supplemental cover being arranged between the sections, substantially as set forth.

2. In a bee-hive, interchangeable sections containing comb-frames, each having bee entrances and a raised bottom provided with bee passages, in combination with a removable supplemental cover composed of two parts, one resting in the lower section upon the comb frames, and the other part in the upper section just below its raised bottom, and the apertured slide or valve sliding in a slot or seat between said parts of said cover, substantially as set forth.

3. The bee-hive, consisting of the separable sections containing comb-frames, each having a raised bottom provided with bee passages, one side forming a door, and having a bee alighting platform and entrances, and a removable supplemental cover composed of two parts, one part resting in the lower section upon the comb frames, and the other part in the upper section just below its raised bottom, and the apertured slide seated intermediately of the parts of said cover and adapted for operation, substantially as specified.

In testimony whereof we affix our signatures in presence of two witnesses.

JACKSON D. HAWKINS.
FRANCIS M. RAY.

Witnesses:
W. A. ANDERSON,
J. B. GREGORY.